Jan. 7, 1947. H. P. FREAR 2,413,821
SHIP CONSTRUCTION
Filed July 9, 1940 2 Sheets-Sheet 1
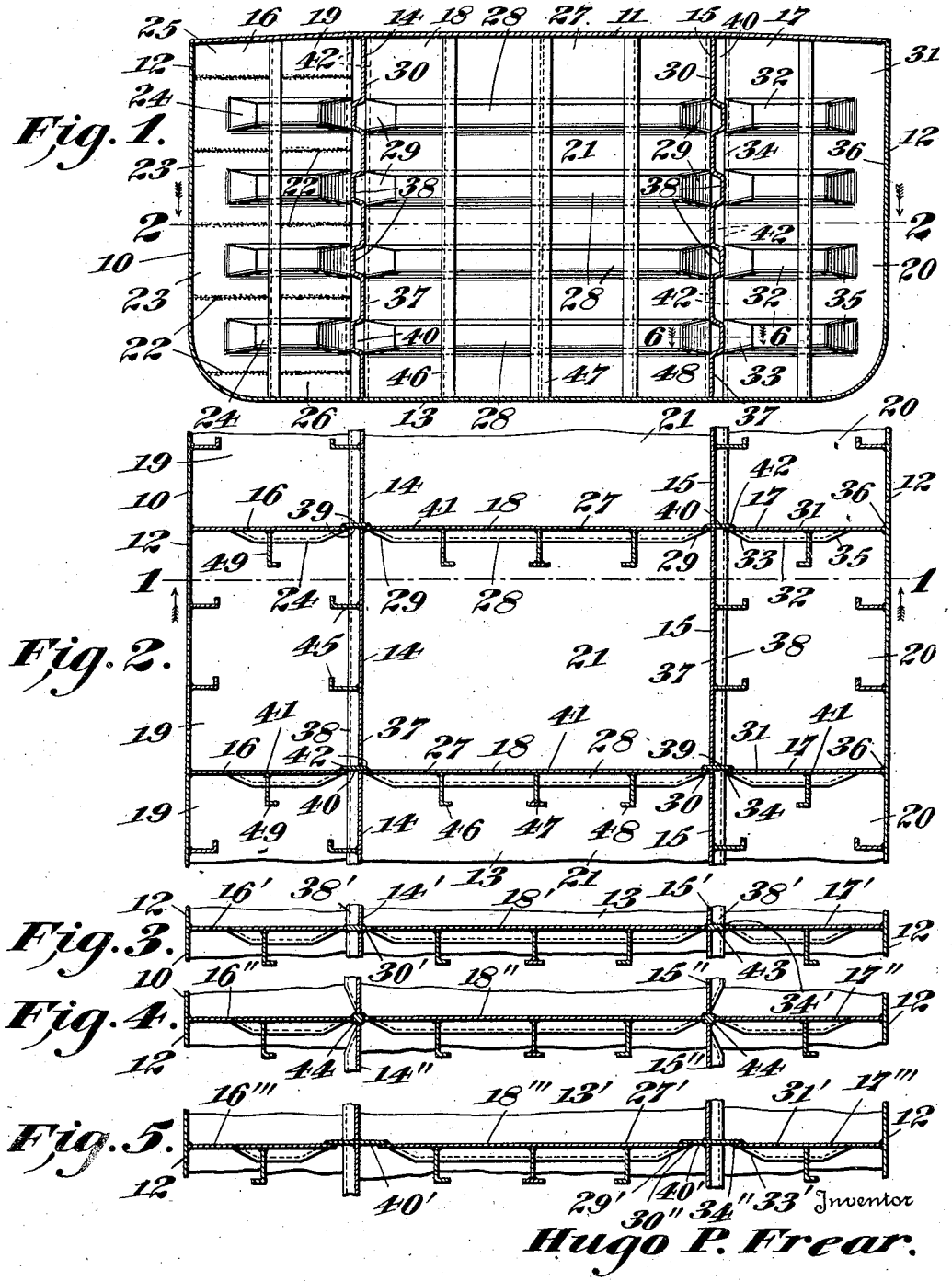
Inventor
Hugo P. Frear.
By R. S. A. Dougherty
Attorney

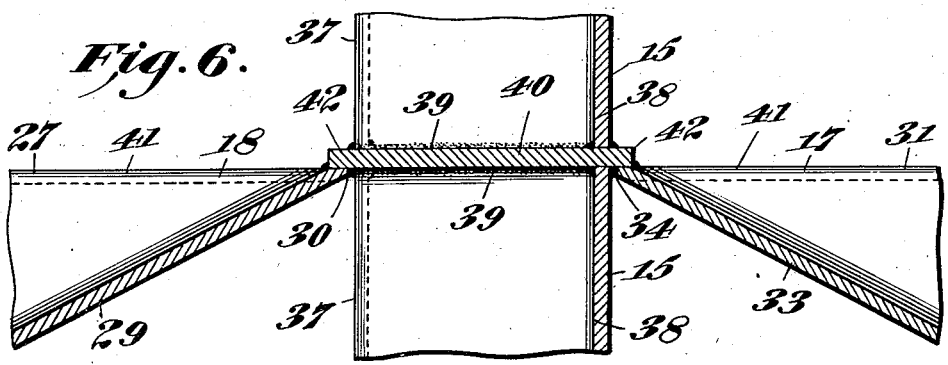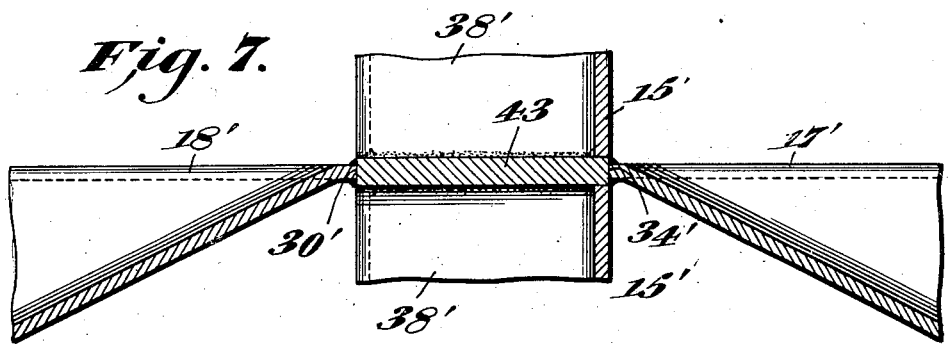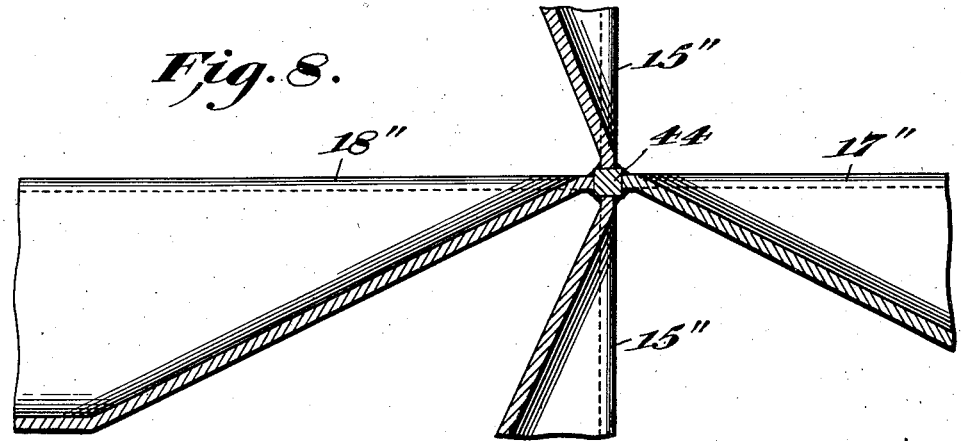

Patented Jan. 7, 1947

2,413,821

UNITED STATES PATENT OFFICE 2,413,821

SHIP CONSTRUCTION

Hugo P. Frear, Manhasset, N. Y., assignor to Bethlehem Steel Company, a corporation of Pennsylvania Application July 9, 1940, Serial No. 344,549

6 Claims. (Cl. 114—79)

My invention relates to improvements in the structure of floating vessels or ships of all types, but more especially to vessels designed to carry liquid cargo in bulk, commonly called tankers.

In vessels of the type referred to it is common to have bottom, side, and deck plating, with a series of tanks formed therewithin by the intersection of water-tight transverse and longitudinal walls or bulkheads. Such a vessel was disclosed in my previous application Serial No. 107,584, which application issued as Patent No. 2,092,504, of September 7, 1937. In my said prior application I disclosed an improved design of ship construction with respect to the reenforcing or stiffening of the said transverse and longitudinal walls or bulkheads. This improved design was more particularly drawn to a form of stiffening means for said walls which comprised the use of a troughed or fluted plate, rolled, pressed, or otherwise formed, having an open face coincident with, or substantially so, the normal plane of a said wall, as its plating. A particular feature of my prior invention was in having a structure supporting an area by means of spaced girders supported at their ends by two oppositely disposed boundary walls, and a plurality of fluted stiffeners supported by said girders transversely thereto having their ends jutting beyond their respective points of support on their adjacent girder but substantially short of the boundary wall to which they are individually longitudinally opposed.

My present invention embodies an improvement in the detail structure along the line of juncture of said fluted walls, and in a modification to the design of said fluted walls. Along the line of juncture of said walls I provide an independent welding bar or welding plate to which I weld the edges of the walls, and I also extend my fluted stiffeners to said edges so that the ends thereof may be welded to said welding bar or welding plate. I also especially provide in my preferred arrangement (Fig. 6) that the edges of said welding bar project laterally of said longitudinal wall constituting a support for the flute ends and edges of said transverse walls. This arrangement not only permits the edges of said transverse walls to overlap said welding bar to which they are welded, but, most important of all, provides the means whereby I extend the edges and flute ends of said middle transverse bulkhead to the said line of juncture and weld them to the said longitudinal wall. In association with the aforesaid detail, I space the web supports to said middle transverse bulkhead so that the distance from said longitudinal bulkhead to the nearest said web support is less than the distance between the said web supports. I also provide for an improvement in the stiffening structure of the outer transverse walls formed between a longitudinal wall and its adjacent ship's side plating. Here I provide horizontal fluted stiffeners having their inner ends extending to the inner vertical edge of said outer transverse wall and being welded to and supported by the welding bar or plate at this line of juncture, while the outer ends thereof are supported in the manner of my prior application, wherein they jut beyond a vertical supporting girder but are substantially short of the ship's side plating.

It is therefore a particular object of this, my present application, to provide an improved structural design wherein the intersecting walls forming the transverse and longitudinal bulkheads of tankers and the like are welded to and supported by a welding bar or plate placed along the vertical line of juncture of said bulkheads.

It is also an object of my invention to form the walls forming the transverse and longitudinal bulkheads of fluted plates that differ from similar plates in my prior application in that the flutes extend to the edges thereof and the edges are welded to and supported by vertical welding bars or plates placed along the line of juncture of said transverse and longitudinal bulkheads.

It is a further object of my invention, in certain wall structures, such as an outer transverse bulkhead between a longitudinal wall or bulkhead and the ship's adjacent side plating, to combine certain features of my prior application with those of my present application, wherein the said outer transverse bulkhead is stiffened by horizontal fluted stiffeners having their inner ends extending to the inner vertical edge thereof and being welded to and supported by the welding bar or plate at this line of juncture, while the outer ends thereof are supported in the manner of my prior application, wherein they jut beyond a vertical supporting girder but are substantially short of the ship's side plating.

The novel features will be more fully understood from the following description and claims taken with the drawings, in which:

Figure 1 represents diagrammatically a transverse section through a tanker embodying my invention;

Figure 2 is a cross section taken along the line 2—2 of Figure 1 showing a series of tanks formed by intersecting walls;

Figures 3 and 4 are modifications similar to Figure 2;

Figure 5 is a variation of Figure 2;

Figure 6 is an enlarged sectional detail of the structure shown in Figure 2 taken along the line 6—6 of Figure 1;

Figure 7 is an enlarged sectional detail of the structure shown in Figure 3 taken as though along the line 6—6 of Figure 1; and Figure 8 is an enlarged sectional detail of the structure shown in Figure 4 taken as though along the line 6—6 of Figure 1.

With respect to the drawings, it is to be understood that only the more essential elements are indicated, and that where a view is partially shown that which is omitted is readily comprehended by what is shown when regarded by those skilled in the art.

Referring now to Figures 1, 2, and 6 which illustrate an embodiment of my invention as applied to the transverse and longitudinal bulkheads of a liquid cargo carrying vessel, the vessel 10 is shown diagrammatically to comprise the deck 11, the sides 12, the bottom 13, a series of longitudinal bulkheads 14 and 15, a series of transverse wing bulkheads 16 and 17, and a series of transverse middle bulkheads 18. These various elements form a series of tanks within the vessel 10 comprising wing tanks 19 and 20, and middle tanks 21.

The bulkheads 14, 15, 16, 17, and 18 are each functionally integral in the sense defined and set forth in my aforesaid prior application. As defined and set forth in said application a functionally integral bulkhead may be formed of a single piece, or of a unit comprising a plurality of parts welded, rivetted, or otherwise suitably attached one to another. In my preferred form of fluted bulkhead a bulkhead will be a functionally integral unit comprised of a series of strakes welded together such as is shown, for example, comprising the wing bulkhead 16 in Figure 1 wherein the lines of welding are shown at 22. It will be noted that certain of the strakes, such as 23, are each provided with a fluted stiffener portion 24, while other strakes, such as 25 and 26, are flat and serve to complete the wall contour. With bulkhead 16 as an example it is to be understood that the bulkheads 14, 15, 17, and 18 may be similarly constructed, or they may be constructed as otherwise set forth above.

In my preferred form of transverse middle bulkhead 18 as shown in Figures 1, 2, and 6 I provide a functionally integral wall unit comprising a plate 27 in which a plurality of horizontal tapered closed end troughs, or flutes 28, are so formed that the closing ends of the tapers 29 of the flutes 28 become substantially coincidental with the normal plane of the plate 27 at its vertical side edges 30.

In my preferred form of transverse wing bulkhead 17 (or 16) as shown in Figures 1, 2, and 6, I provide a functionally integral wall unit comprising a plate 31 in which a plurality of horizontal tapered closed end troughs, or flutes 32, are so formed that the closing ends of the tapers 33 of the flutes 32 become substantially coincidental with the normal plane of the plate 31 at its inner vertical side edge 34, while the closing ends of the tapers 35 at the opposite ends of the flutes 32 end with the normal plane of the plate 31 substantially short of the plate's outer (or ship's plating side) vertical side edge 36.

In my preferred form of longitudinal bulkhead 14 (or 15) as shown in Figures 1, 2, and 6, I provide a functionally integral wall unit comprising a plate 37 in which a plurality of horizontal troughs, or flutes 38, are so formed as to extend in uniform cross section full length of the width of the plate 37 to its vertical side edges 39. These flutes are not closed at the ends except as will be described hereinafter in connection with the juncture forming of the transverse and longitudinal bulkheads.

For the uniting of the transverse and longitudinal bulkheads at their lines of intersection within the vessel 10 to form water-tight tanks 19, 20, and 21, I prefer to weld the edges that come adjacent to the ship's deck 11, sides 12, and bottom 13 plating directly thereto, or to unite them therewith by other well known means, neither of which is particularly shown or described herein since these joints do not form a part of my invention. On the other hand the water-tight joints forming the juncture of the transverse and longitudinal bulkheads along their lines of intersection is a particular feature of my invention and I show my preferred form thereof in Figures 1, 2, and 6. I provide a vertical welding bar, or plate 40, at each of the intersections of the transverse and longitudinal bulkheads welded at its upper and lower ends to the ship's deck and bottom plating, respectively. The bar, or plate 40, is selected to be wider than the overall depth of the flutes 38 in the longitudinal bulkheads 14 and 15. The bars, or plates 40, are each placed with one of their wide faces co-planar with the plane of the outer faces 41 of the transverse bulkheads 16, 17, and 18, adjacent thereto as the case may be, in such a manner, that, when the edges 39 of the longitudinal bulkheads are positioned centrally thereof and welded thereto, a projecting edge 42 is left at each side of the vertical outer faces of the bulkheads 15 at their edges 39 which provide supporting ledges upon which adjacent edges 30 and 34 of the transverse bulkheads 16 or 17, and 18 may be supported by and welded water-tight thereto.

In Figures 3 and 7 I show a modification in the method of uniting the transverse and longitudinal bulkheads at their lines of intersection within the vessel 10 to form water-tight tanks 19, 20, and 21. In this modification the welding bar, or plate 43 is similar to the bar shown in Figures 1, 2, and 6 but is not necessarily wider than the overall depth of the flutes 38' in the longitudinal bulkheads 14' or 15', and the vertical adjacent edges 39' and 34' of the transverse bulkheads 16' or 17' and 18' are butt welded thereto instead of lap welded as shown in Figures 1, 2, and 6.

In Figures 4 and 8 I show a modification in which not only is the welding bar 44 modified to a substantially square section but both the transverse and longitudinal bulkheads 14" or 15" are constructed with closed tapered ends similar to the closed tapered ends of the transverse bulkheads hereinbefore described, and all the said closed tapered ends occurring at each intersection are butt welded to said square welding bar 44. The lines of transverse bulkheads 16" or 17" and 18" and longitudinal bulkheads 14" or 15" are aligned with their respective outer faces co-planar. Although in this modification I show a square bar for the welding bar 44 it will be apparent to those skilled in the art that a solid bar of other section might serve as well and be equivalent to a square bar, such as round, hexagon, or the like.

In Figure 5 I show a variation of my preferred form shown in Figures 1, 2 and 6. Here I provide a welding bar, or plate 40' considerably wider than the overall depth of the flutes of the longitudinal bulkheads. In this arrangement I use fluted transverse bulkheads 16''' or 17''', and 18''' similar to but shorter than the fluted transverse bulkheads 16 or 17, and 18 of Figure 1 and 2, and which in a like manner have the closed tapered ends 29' and 33' of said flutes terminating substantially coincidental with the normal planes of the plates 27' and 31' at their edges 30'' and 34'', respectively, with the result that the said closed ends are substantially short of the adjacent longitudinal bulkhead to which they are directly opposed.

For supporting the fluted transverse and the fluted longitudinal bulkheads additionally to their respective boundary walls, I provide beams or girders as disclosed in my hereinabove mentioned prior application No. 107,584. For example, longitudinal bulkhead 14 is attached to and supported by the girders 45. Transverse middle bulkhead 18 is attached to and supported by the girders 46, 47 and 48. Transverse wing bulkhead 16 has the girder 49 to which it is attached and by which it is supported. In each case, the girders 45, 46, 47, 48, and 49 are attached at their upper and lower ends to the ship's deck and bottom plating, respectively. In Figures 1, 2, 3, 4, and 5 I show the preferred spacing of said web supports for the middle transverse bulkhead, or wall 18, herein first referred to. I space the longitudinal walls 14 and 15 closer to the nearest web supports 46 and 48 than web support 47 is to either 46 or 48. This spacing is approximately determined by making the area of said bulkhead or wall between supports 46 and 48 55% or more of the total area of said wall between said longitudinal walls 14 and 15. I also show the edges of said middle transverse wall 18 in Figures 2 and 6 extended to within welding distance along the said line of juncture. I also show in Figures 2 and 6 the edges 42 of said welding bar designed to form laterally projecting support brackets for said wall edges.

From the foregoing description it will now be readily recognized by those skilled in the art that I have a novel method of ship construction which is particularly economical of weight without any sacrifice in efficiency or strength. I have shown and described a variety of arrangements for the water-tight juncture of the lines of intersection of the transverse and longitudinal fluted bulkheads within the vessel, but each arrangement has been characterized by a welding bar, or plate, to which the adjacent vertical edges of the bulkheads are welded; while the fluted bulkheads, both transverse and longitudinal, have been characterized by having the flutes thereof extend to the very edges of the bulkheads that are welded to said welding bar. Also, the said flutes in each case are characterized by structure whereby it enters into the main plating of the bulkhead as a functionally integral element thereof.

I do not wish it to be understood that my above described methods are limited in their application to vessels of the type described and it is manifest that the principle of design herein set forth could be utilized with other well known types of ship construction.

The terms and expressions which I have employed are used as terms of description and not of limitation as I have no intention, in the use of such terms and expressions, of excluding any equivalents of the features thereof, but recognize that various modifications are possible within the scope of the invention claimed.

Having thus described my invention what I claim as new and desire to secure by Letters Patent is:

1. In a tank structure having a series of water-tight compartments therewithin, exterior walls comprised of top, bottom, and side plating, and interior boundary walls forming said compartments, certain of said boundary walls each comprising a plate having functionally integral therewith a plurality of horizontal relatively narrow fluted recessed portions, said recessed portions being of uniform cross section throughout a substantial portion of their length and tapering in depth at the ends thereof to be substantially coincidental with the plane of said plate at interior vertical edges thereof, and an unflanged bar fixed at each interior vertical corner juncture of said compartments, the said bar being welded water-tight to each adjacent one of said vertical edges.

2. In a tank structure having a series of water-tight compartments therewithin, exterior walls comprised of top, bottom, and side plating, and interior boundary walls forming said compartments, certain co-planar ones of said boundary walls each comprising a plate having functionally integral therewith a plurality of horizontal relatively narrow fluted recessed portions, said recessed portions being of uniform cross section throughout a substantial portion of their length and tapering in depth at the ends thereof to be substantially coincidental with the plane of said plate at interior vertical edges thereof, other co-planar ones of said boundary walls extending transversely of said first mentioned co-planar walls each comprising a plate having functionally integral therewith a plurality of horizontal relatively narrow fluted recessed portions extending in uniform cross-section to the vertical edges of said plate, and an unflanged juncture plate fixed at each interior vertical corner juncture of said compartments, the edges of said juncture plate being welded water-tight to its adjacent one of said vertical edges of the first mentioned co-planar boundary walls and the faces of said juncture plate being welded water-tight to its adjacent one of said vertical edges of the second mentioned co-planar boundary walls.

3. In a tank structure having a series of water-tight compartments therewithin, exterior walls comprised of top, bottom, and side plating, and interior boundary walls forming said compartments, certain of said boundary walls each comprising a plate having functionally integral therewith a plurality of horizontal relatively narrow fluted recessed portions, said recessed portions being of uniform cross section throughout a substantial portion of their length and tapering in depth at the ends thereof to be substantially coincidental with the plane of said plate at interior vertical edges thereof, and an unflanged bar fixed at each interior vertical corner juncture of said compartments, the said bar being welded water-tight to each adjacent one of said vertical edges, and each of said interior boundary walls being supported by a vertically disposed web attached at its ends to said top and bottom plating respectively.

4. In a tank structure having a series of water-tight compartments therewithin, exterior walls comprised of top, bottom, and side plating, and interior boundary walls forming said compartments, certain co-planar ones of said boundary walls each comprising a plate having functionally integral therewith a plurality of horizontal relatively narrow fluted recessed portions, said recessed portions being of uniform cross section throughout a substantial portion of their length and tapering in depth at the ends thereof to be substantially coincidental with the plane of said plate at interior vertical edges thereof, other co-planar ones of said boundary walls extending transversely of said first mentioned co-planar walls each comprising a plate having functionally integral therewith a plurality of horizontal relatively narrow fluted recessed portions extending in uniform cross-section to the vertical edges of said plate, and an unflanged juncture plate fixed at each interior vertical corner juncture of said compartments, the edges of said juncture plate being welded water-tight to its adjacent one of said vertical edges of the first mentioned co-planar boundary walls and the faces of said juncture plate being welded water-tight to its adjacent one of said vertical edges of the second mentioned co-planar boundary walls, and each of said interior boundary walls being supported by a vertically disposed web attached at its ends to said top and bottom plating respectively.

5. In a tank structure having a series of watertight compartments therewithin, exterior walls comprised of top, bottom, and side plating, and interior boundary walls forming said compartments, one of said interior boundary walls being normal to and in contact with said side plating, a web supported at its ends by said top and bottom plating, the said one of said interior boundary walls comprising a plate having functionally integral therewith a plurality of horizontal relatively narrow parallel closed end fluted recessed portions transverse to and supported at points on said web, all the ends of said fluted recessed portions extending beyond their points of support on said web toward said side plating and substantially short thereof and all the ends opposite thereto extending to the inner vertical edge of said plate, and an unflanged bar fixed at each interior vertical corner juncture of said compartments, the said inner vertical edge of said recessed plate being welded water-tight to a said bar.

6. In a tank structure having a series of water-tight compartments therewithin, exterior walls comprised of top, bottom, and side plating, and interior boundary walls forming said compartments, one of said interior boundary walls being normal to and in contact with said side plating, a web supported at its ends by said top and bottom plating, the said one of said interior boundary walls comprising a plate having functionally integral therewith a plurality of horizontal relatively narrow parallel closed end fluted recessed portions transverse to and supported at points on said web, all the ends of said fluted recessed portions extending beyond their points of support on said web toward said side plating and substantailly short thereof and all the ends opposite thereto extending to the inner vertical edge of said plate, and an unflanged juncture plate fixed at each interior vertical corner juncture of said compartments, the said inner vertical edge of said recessed plate being welded water-tight to a said juncture plate.

HUGO P. FREAR.